United States Patent
Carr

[19]

[11] Patent Number: 5,900,586
[45] Date of Patent: May 4, 1999

[54] CABLE CARRIERS WITH INDIVIDUAL SLEEVE UNITS CARRIED BY A HOSE

[75] Inventor: Roger John Carr, Croydon, United Kingdom

[73] Assignee: SMED Inc., Bridgetown, Barbados

[21] Appl. No.: 08/939,988

[22] Filed: Sep. 29, 1997

Related U.S. Application Data

[63] Continuation of application No. 08/544,180, Oct. 17, 1995, abandoned.

[30] Foreign Application Priority Data

Oct. 18, 1994 [GB] United Kingdom .................. 9420974
May 31, 1995 [GB] United Kingdom .................. 9510941

[51] Int. Cl.⁶ .................................................. H02G 3/04
[52] U.S. Cl. ........................ 174/95; 174/97; 59/78.1; 248/49
[58] Field of Search .................. 174/135, 69, 72 A, 174/72 C, 95, 96, 97, 99 E, 101; 59/78, 78.1; 248/49, 51

[56] References Cited

U.S. PATENT DOCUMENTS

| 3,696,647 | 10/1972 | Balicki | 70/49 |
| 3,934,804 | 1/1976 | Bruce | 248/229.15 |
| 4,840,023 | 6/1989 | Borsani | 59/78.1 |
| 5,134,251 | 7/1992 | Martin | 174/136 |

*Primary Examiner*—Kristine Kincaid
*Assistant Examiner*—Kamand Cuneo
*Attorney, Agent, or Firm*—Kirschstein, et al

[57] ABSTRACT

A flexible cable carrier for connection of cabling between furniture units comprising a plurality of spaced and sequentially linked sleeve units which enable the cabling to be protectively and flexibly carried. Each unit may be carried on a continuous central flexible hose and may have slotted outer cavities for accommodating the cabling. The carrier may have ball ends for attachment in fittings on the edges of the furniture unit held in place by snap fittings in rabbet channels.

8 Claims, 7 Drawing Sheets

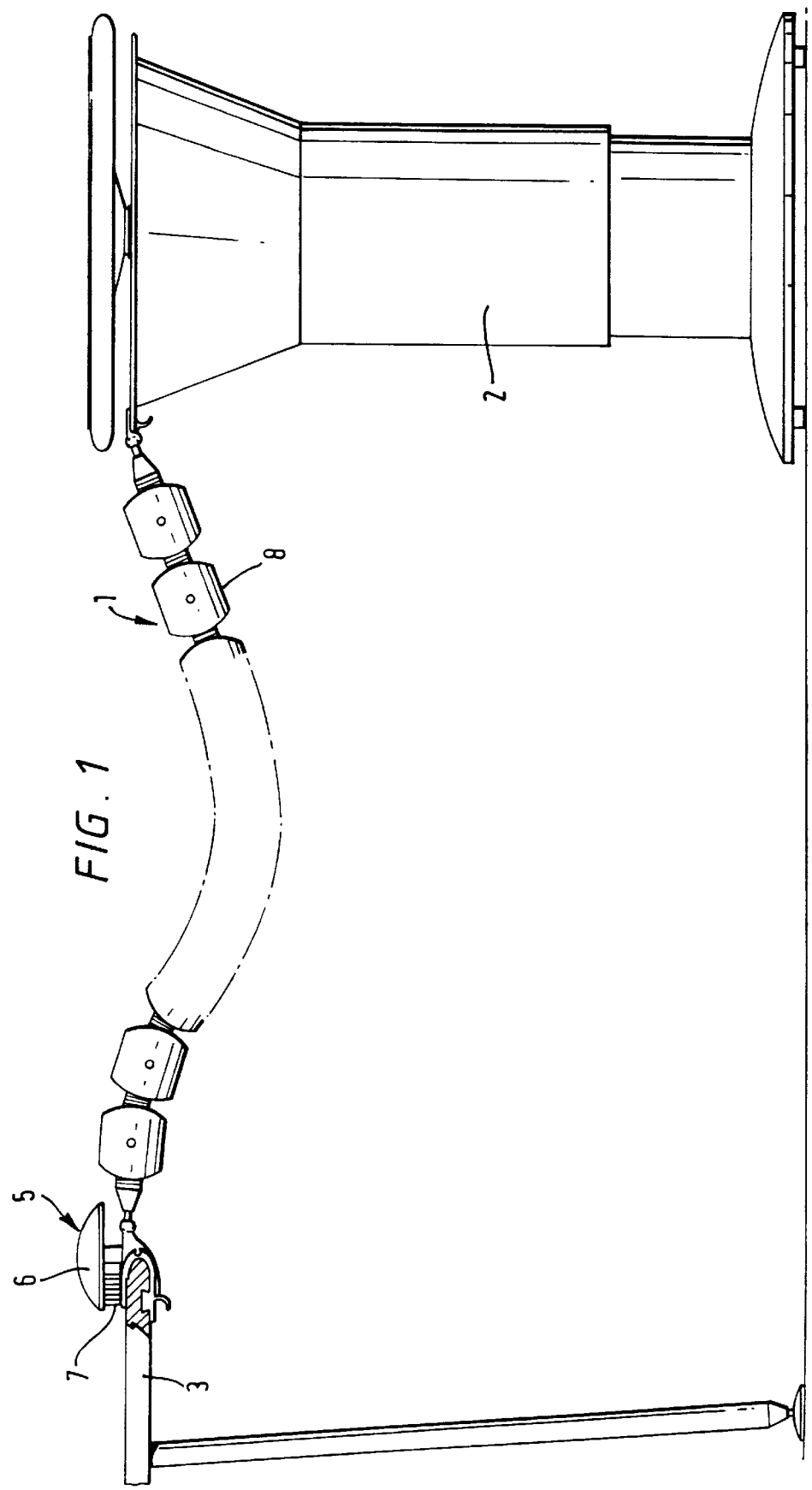

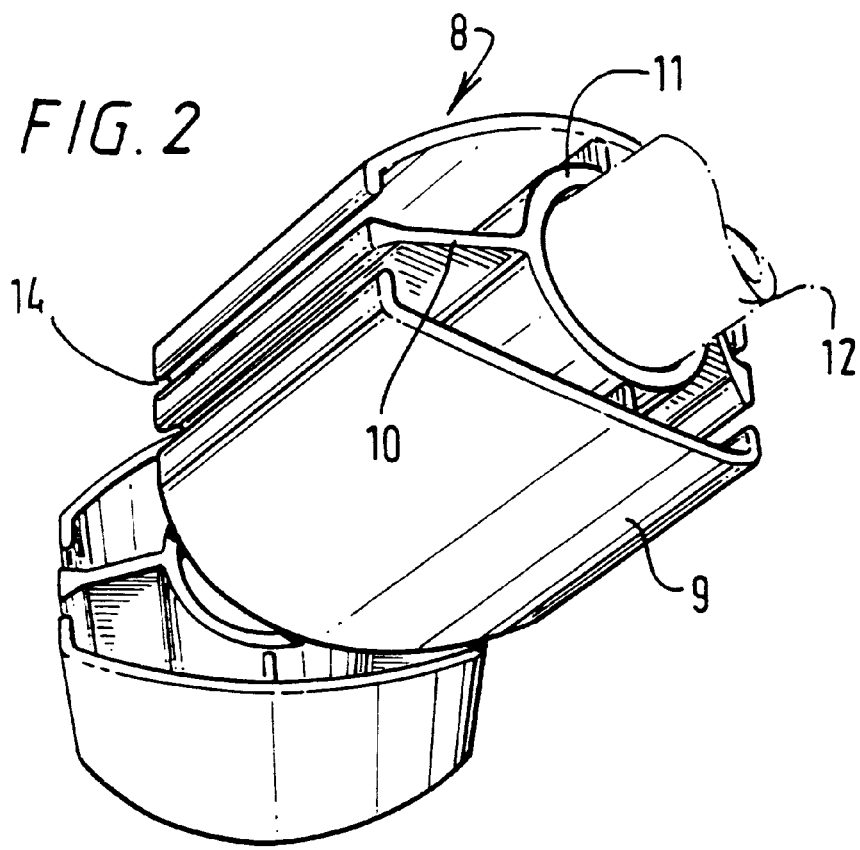
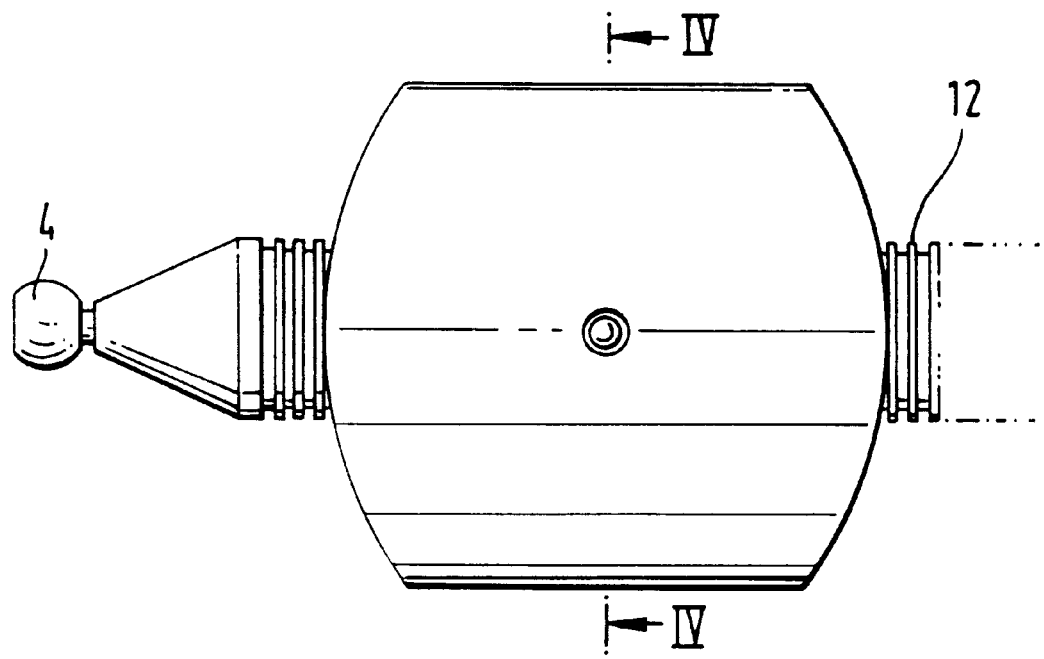

5,900,586

CABLE CARRIERS WITH INDIVIDUAL SLEEVE UNITS CARRIED BY A HOSE

This application is a continuation of application No. 08/544,180, now abandoned filed Oct. 17, 1995.

BACKGROUND OF THE INVENTION

The present invention relates to cable carriers, particularly flexible cable carriers for use between furniture units used in offices where computer equipment, telephones and other electrical machinery have to be supplied with power and data via such cabling.

When supplying cabling from one free standing piece of furniture to another, say from a desk unit to a computer stand, it is desirable that the cabling is kept tidily out of harm's way, is protected from damage and does not become tangled or unsightly.

SUMMARY OF THE INVENTION

Accordingly the present invention provides a flexible cable carrier for connection of cabling between furniture units, comprising a plurality of spaced and sequentially connected sleeve units which enable the cabling to be protectively and flexibly carried and at least one end clip means for clipping an end of the cable carrier to a furniture unit.

Conveniently the clip can be a ball joint which provides a link to the furniture unit. This allows the carrier to be mechanically sound while avoiding mechanical tension on the cabling.

Preferably each sleeve has a central region within which a continuous flexible hose is located and has slotted outer cavities within which cabling can be located. Each sleeve may be formed with a central region being of circular cross-section to accommodate the continuous flexible hose and which carries an outer casing of a substantially elliptical cross-section joined to the central region by radial webs. The space between the outer casing and the central region can then define the cavities to receive the cabling.

As well as being preferably of substantially elliptical cross-section in its outer casing, the sleeve should preferably have rounded ends to permit flexible articulation of the cable carrier.

BRIEF DESCRIPTION OF THE DRAWINGS

An embodiment of the invention will now be described by way of example of reference to the accompanying diagrammatic drawings in which:

FIG. 1 shows schematically a pedestal supply unit and a table with a cable carrier there between.

FIG. 2 shows a perspective view of part of the cable carrier.

FIG. 3 shows a plan view of an end fitting of the cable carrier.

DETAILED DESCRIPTION OF THE PREFERRED EMBODIMENTS

Figure 4:
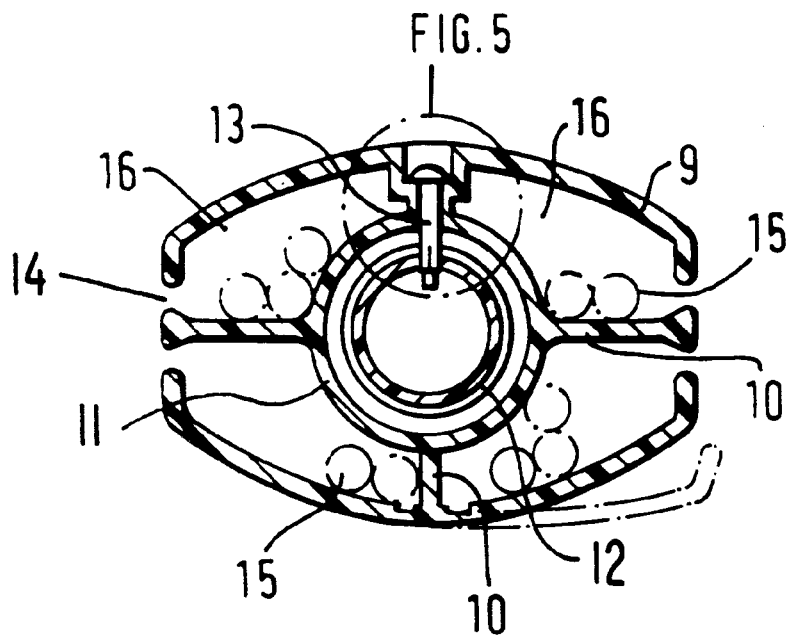
FIG. 4 shows a section taken on the line IV—IV of Figure.

Referring to FIG. 1D a flexible carrier 1 in accordance with the invention provides a link between a pedestal, a free standing pedestal unit 2 and a table 3. Referring to FIG. 3, the cable carrier terminates in ball joint ends 4, one of which slots into an upper rim of a pedestal unit 2, while the other end slots into a clamping unit 5 clamped to the table 3.

The clamping unit 5 is clamped to the table edge and includes a cover 6 and multiple posts 7 which allow wiring to be held in position before being fed to equipment on the table 3.

Referring to FIG. 2, the cable carrier 1 comprises a plurality of sleeve units 8 of a moulded plastics material each of which has an outer casing 9 of substantially elliptical cross-section (see FIG. 4) which is connected via radial webs 10 to an inner circular section 11 which houses a central support hose 12 which is a plastics moulding of pleated shape (see FIG. 3) to provide a flexible but firm support for the carrier. Each sleeve unit 8 is attached to the central hose 12 by means of a single rivet 13 (see FIGS. 4 and 5). In an alternative form a ribbed stud of plastics material is used which can be snapped into position.

Figure 5:
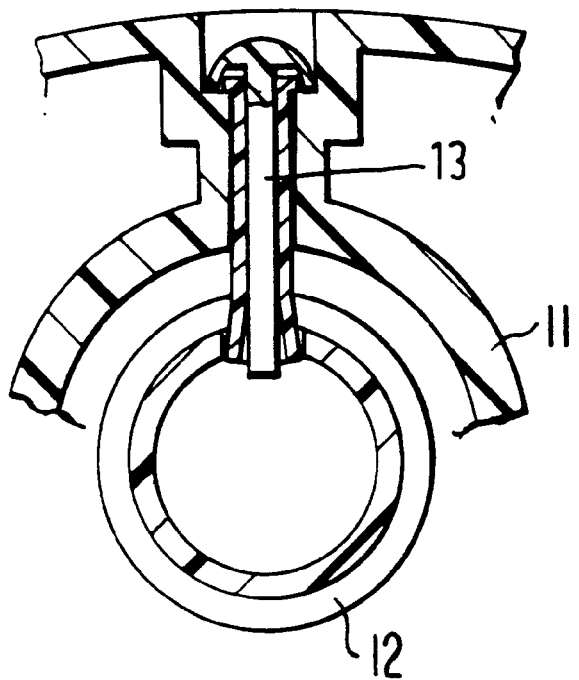
FIG. 5 shows an enlarged fragment of the FIG. 4 view.

Referring to FIGS. 2 and 4, the outer casing 9 includes slots 14 which, due to the inherent resilience of the plastics material of which the sleeve units are formed, enables wiring 15 to be readily received within the cavities 16 defined between the outer wall of the casing 9 and the inner circular wall 11.

Figure 6:
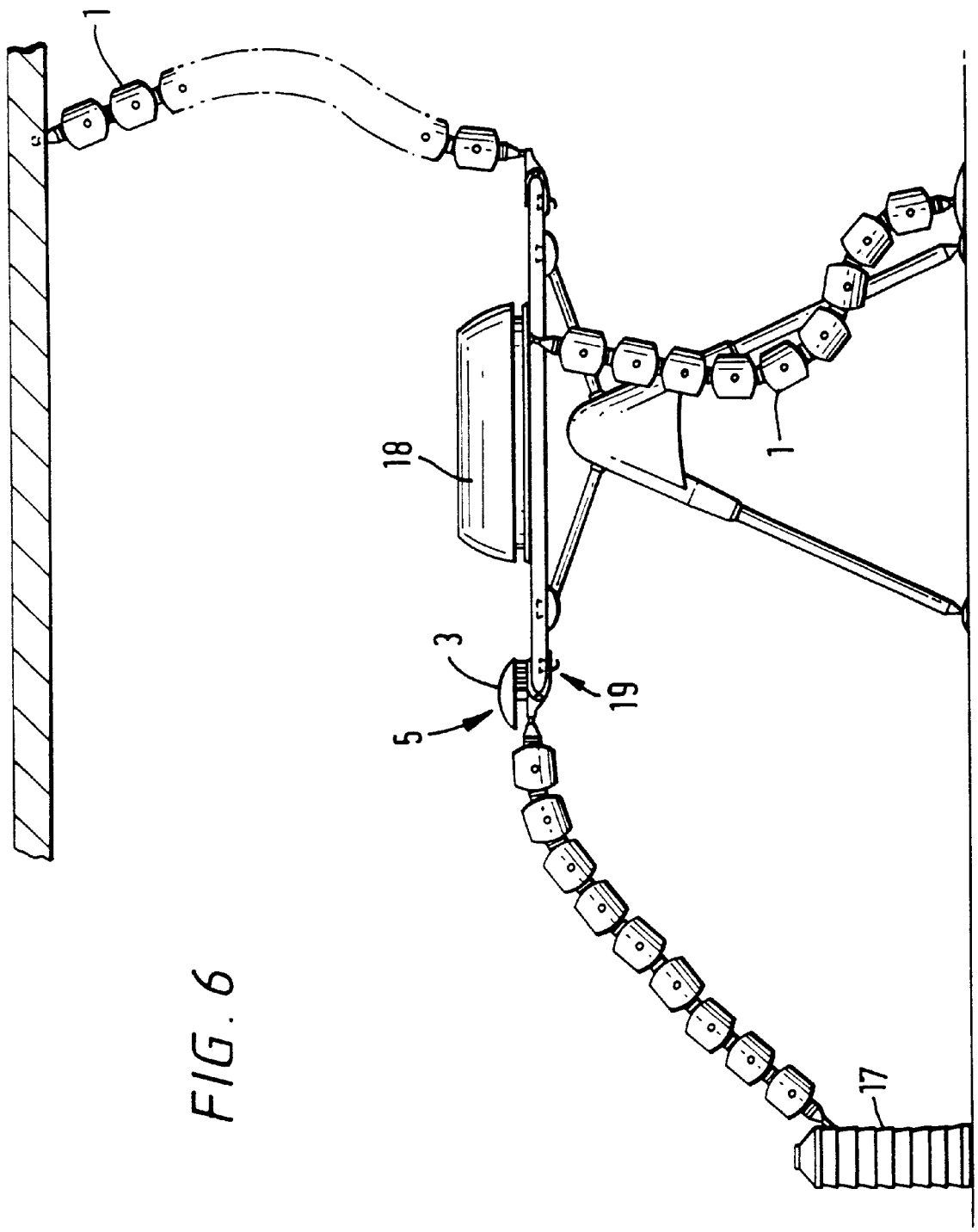
FIG. 6 is a side elevation of a work table incorporating cable carriers.
Figure 8:
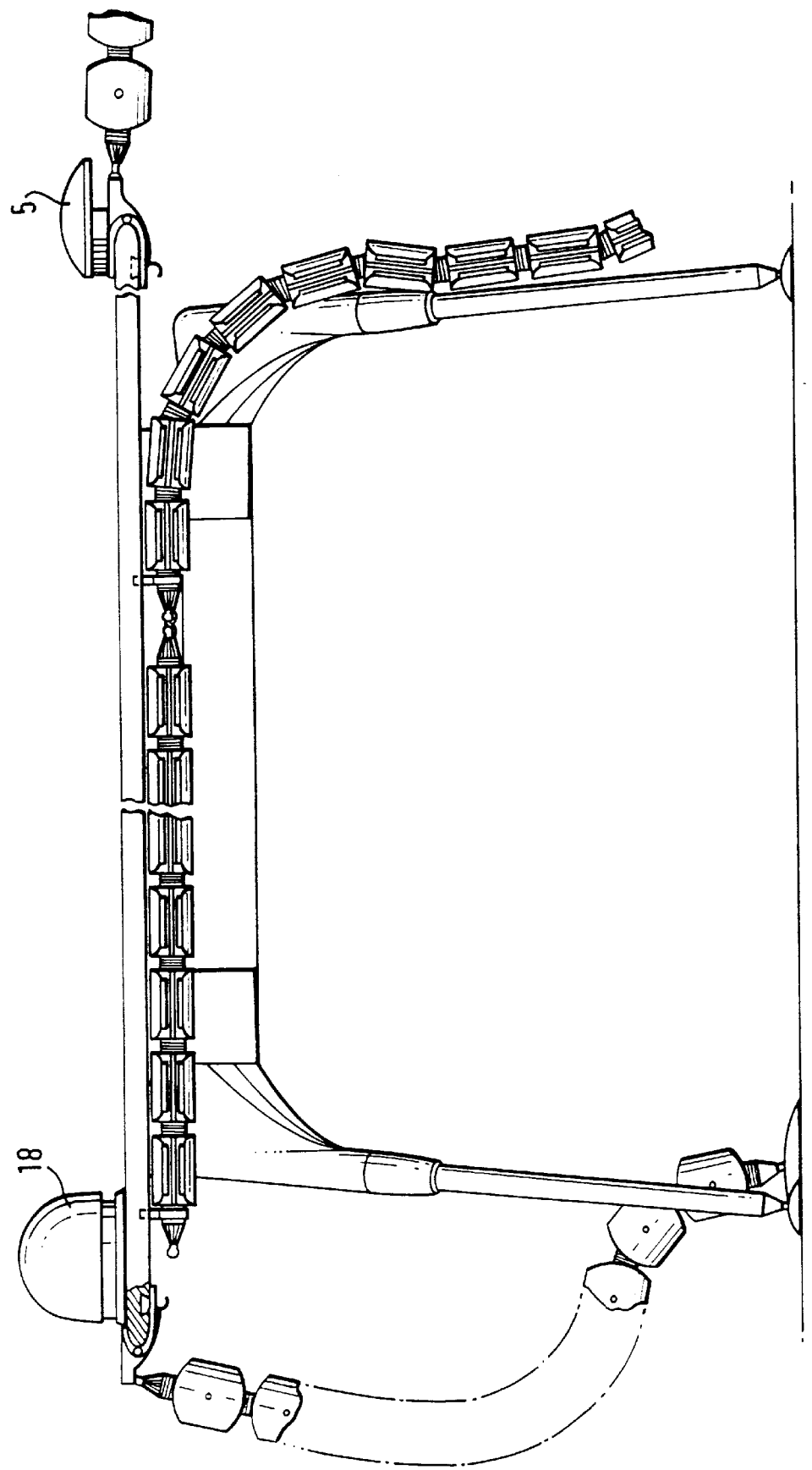
FIG. 8 is a side elevation of the table of FIG. 6.

FIGS. 6 and 8 show a table with several cable carriers attached to the edge of the table top. In each case a snap fitting within a rabbet channel under the edge of the table top provides a female ball receptor for reception of a ball at the end of the cable carrier. This includes a finger hook 19 protruding downwards to enable the snap fitting to be removed.

Figure 7:
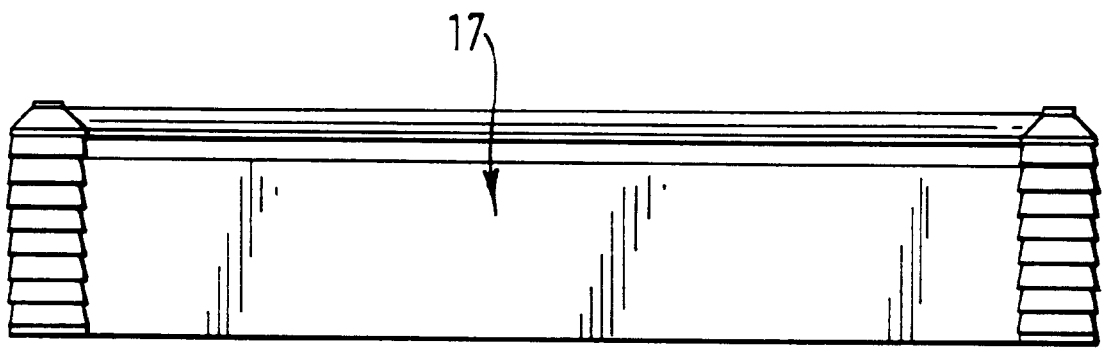
FIG. 7 is a side sectional elevation of a floor level unit.

Connections of the cable carrier to the following are shown:

a) to the ceiling b) to a floor mounted spine unit 17 (see FIG. 7) which can carry a length of cable carrier while providing access for wiring via removable side panels c) to a domed edge unit 5 which controls the wiring as it is fed to units on the table d) to a high domed plug cover 18. Within the domed plug cover 18 are a series of mains sockets to provide power for units on the table.

e) to a simple floor unit for access below the floorboards.

Figure 9:
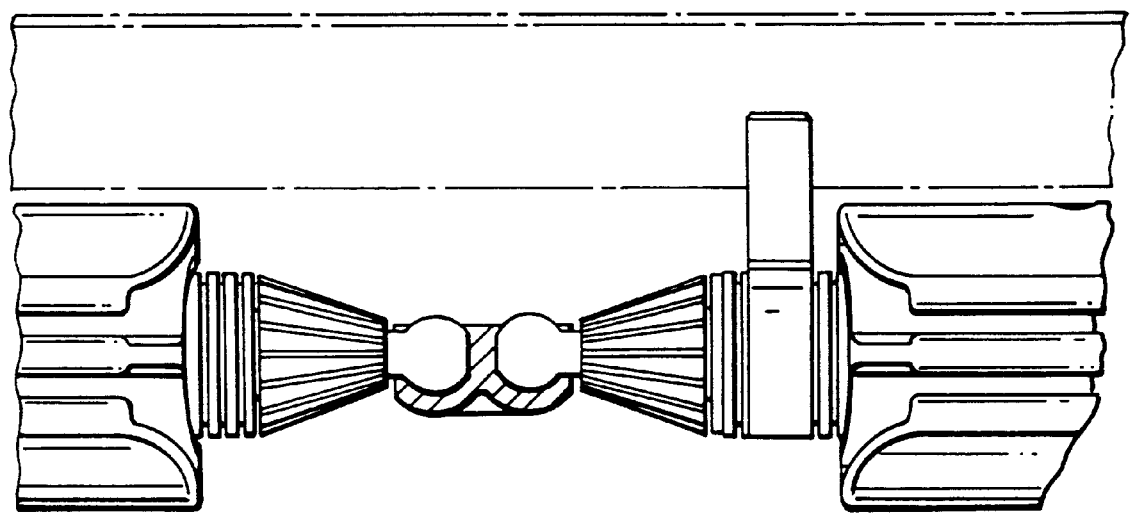
FIG. 9 is an enlarged detail of a connector.

FIG. 9 shows in detail the way two ends of two cable carriers are connected together. A plastics moulding including two ball receptors simply enables two cable carrier ball ends to be snapped together.

Figure 10:
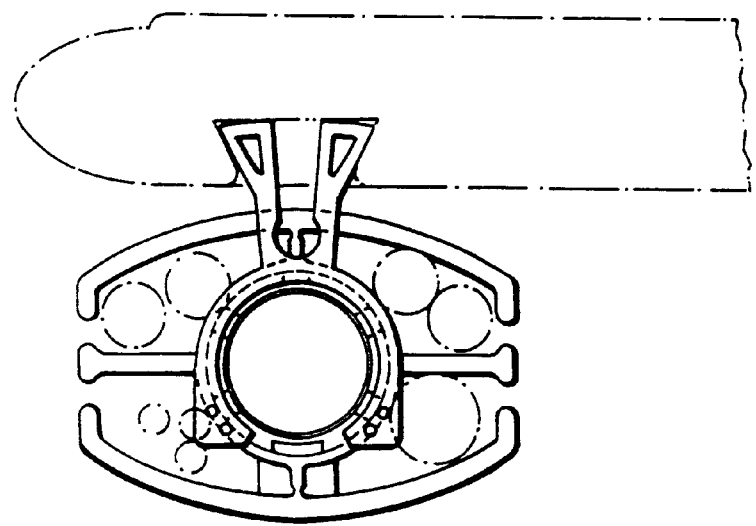
FIG. 10 is a view of a cable carrier carried below a work top.

FIG. 10 shows how the cable carrier is carried below a work top.

I claim:

1. A flexible cable carrier for connection of cabling between furniture, comprising: a continuous, flexible carrier hose extending along a longitudinal path; and a plurality of separate, sequential, sleeve units all carried by said hose in the same orientation, for enabling the cabling to be protectively carried, each of said sleeve units having a central region within which said carrier hose is located, outer cavities within which the cabling is located, and exterior peripheral slots through which the cabling enters said sleeve units into said outer cavities, said slots of adjacent ones of said sleeve units in the same orientation being substantially in alignment all along the longitudinal path, for evenly laying the cabling along said aligned slots.

2. The flexible cable carrier according to claim 1 wherein of said each sleeve units is in a form in which said central region is of substantially circular cross-section to accommodate said carrier hose, and has an outer casing for accommodating said outer cavities to provide protective cover to a major part of the cabling located within said outer cavities.

3. The flexible cable carrier according to claim 1, wherein each of said sleeve units is in a form in which said central region is of substantially circular cross-section to accommodate said carrier hose, and has an outer casing for accommodating said outer cavities, said outer casing being of a substantially elliptical cross-section joined to said central region by radial webs, said aligned slots being located at extremities of said substantially elliptical cross-section.

4. The flexible cable carrier according to claim 1, and further comprising at least one clip means for clipping an end of the cable carrier to a furniture article.

5. The flexible cable carrier according to claim 1, in which each of said sleeve units has rounded ends to permit flexible articulation of the cable carrier.

6. The flexible cable carrier according to claim 1, and further comprising a ball at each end of said carrier hose.

7. The flexible cable carrier according to claim 6, and further comprising a female coupling unit having a pair of ball-receiving sockets.

8. The flexible cable carrier according to claim 1, and further comprising snap fittings attachable to edge regions of a table top via a rabbet channel beneath the table top, each of said snap fittings having a ball joint connection for connecting the cable carrier to a respective one of said snap fittings.

* * * * *